Jan. 17, 1967  R. L. VOGELPOHL  3,298,813
MOLD AND PLUNGER FOR PRESSING FLANGED GLASS ARTICLES
Filed Feb. 4, 1963  3 Sheets-Sheet 3
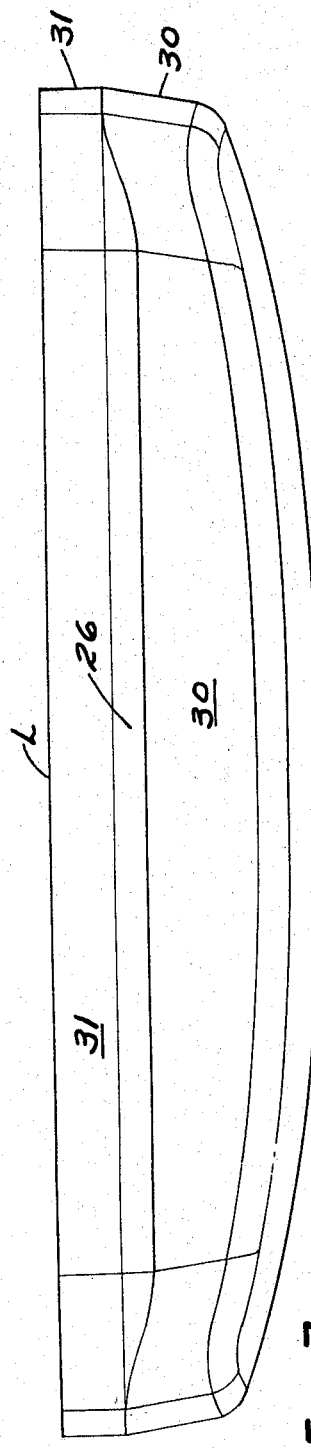
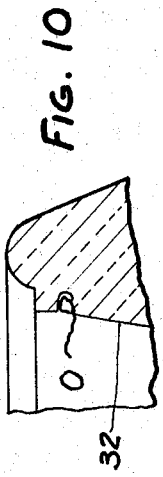
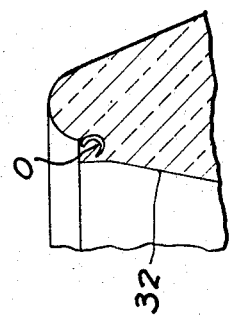
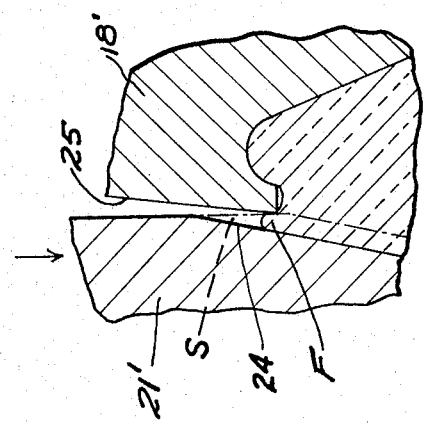
INVENTOR.
ROLAND L. VOGELPOHL
BY
ATTORNEYS

# United States Patent Office 3,298,813
Patented Jan. 17, 1967

3,298,813
MOLD AND PLUNGER FOR PRESSING FLANGED GLASS ARTICLES
Roland L. Vogelpohl, Gahanna, Ohio, assignor to Owens-Illinois Glass Company, a corporation of Ohio
Filed Feb. 4, 1963, Ser. No. 255,762
5 Claims. (Cl. 65—305)

This invention relates to pressing flanged glass articles which are to be hermetically sealed to another glass part by thermal fusion. More specifically, the invention relates to face plates having a base portion and a flange portion which are hermetically sealed to a glass funnel to form a cathode ray tube envelope.

Face plates for cathode ray tube envelopes conventionally comprise a base portion and an annular flange portion extending at a generally right angle from the periphery of the base portion. Such face plates are usually made by introducing a charge of molten glass into a mold which has a base surface, a flange surface and a radially inwardly extending edge surface, and moving a plunger axially into the mold. The plunger has an external surface corresponding to the internal surface of the face plate that is to be formed and cooperates with the mold to form the glass article. It has long been known that face plates made in this manner have an inherent defect in that a condition directly responsible for the formation of small blisters in the face-funnel seal often exists at or near the upper edge of the flange portion which forms the sealing edge for hermetically sealing the face plate to the funnel. This undesirable condition or defect exists when gases or dirt particles in or near the sealing edge expand or volatilize during the face-funnel sealing process to form a series of small gaseous inclusions or blisters in the seal and prevent the formation of a good hermetic seal.

It is an object of this invention to eliminate the seal defect condition which exists in the sealing edge of flanged glass articles such as the face plates which are to be hermetically sealed to a funnel to form a cathode ray tube envelope.

It is a further object of the invention to provide a novel face plate construction.

It is a further object of the invention to provide a novel method and apparatus for forming face plates for cathode ray tube envelopes.

It is a further object of the invention to provide a cathode ray tube envelope having an improved hermetic joint between the face plate and the funnel.

In the drawings:

FIG. 2 is a fragmentary sectional view on a greatly enlarged scale showing the interrelationship between the plunger and mold apparatus in the forming of the flange portion of the face plate or the like.

FIG. 7 is a fragmentary side elevational view of the plunger shown in FIG. 1.

FIG. 8 is a partly diagrammatic sectional view of prior art apparatus similar to FIGS. 2 and 3 showing the theory involved in my invention.

FIG. 9 is a partly diagrammatic sectional view of a flange portion of a glass article showing the seal defect made in accordance with the apparatus shown in FIG. 8.

FIG. 10 is a view similar to FIG. 9 showing a slightly different seal defect.

Figure 1:
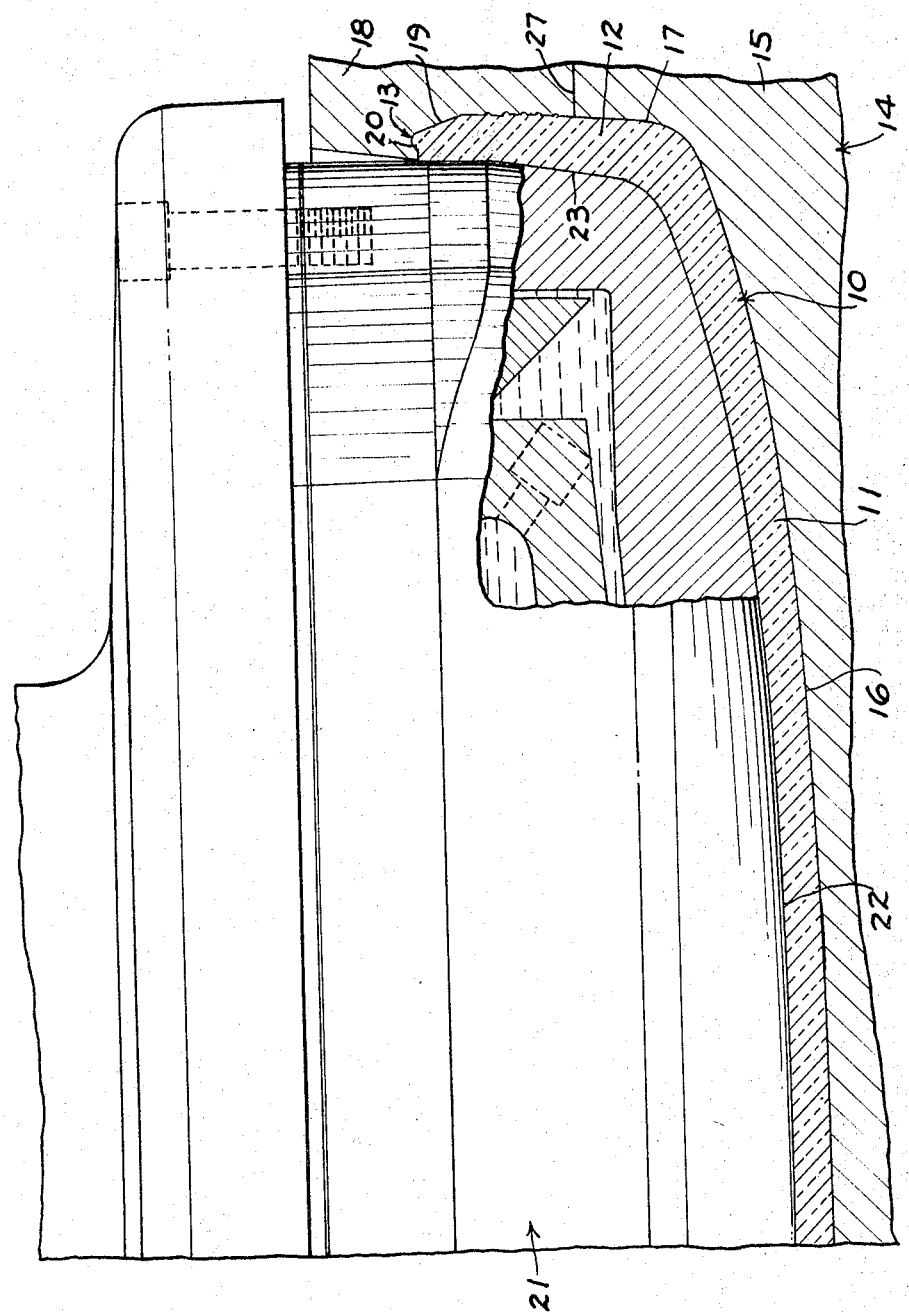
FIG. 1 is a fragmentary part sectional elevation of an apparatus for pressing a face plate for cathode ray tube envelopes or the like corresponding to a section taken along line 1—1 in FIG. 4.

Referring to FIG. 1, which is a fragmentary part sectional view through an apparatus for pressing a glass article such as a face plate 10 for attachment to a glass funnel for forming a glass cathode ray tube envelope; face plate 10 conventionally comprises a concavo-convex base portion 11 and an annular flange portion 12 extending generally at a right angle from the periphery of the base portion 11. The upper end 13 of the flange portion 12 defines a sealing surface which is adapted to be heated for sealing the face plate 10 to a funnel or the like to form a glass cathode ray tube envelope.

Such a face plate or the like is conventionally formed in a mold 14 which comprises a base 15 having a concave base molding surface 16 that defines the outer surface of the base portion 11 of the face plate 10 and a flange forming surface 17 that defines a part of the flange portion 12 of the face plate. Mold 14 also comprises a shell ring 18 which is supported on the base 15 and defines a further flange forming surface 19 and a sealing edge forming surface 20 extending radially inwardly.

A plunger 21 is adapted to be moved downwardly and axially into the mold 14 to press a charge of molten glass and form the face plate. Plunger 21 includes a convex base molding surface 22 that defines the inner surface of the base portion 11 of the face plate 10 and a peripheral flange forming surface 23 that defines the inner surface of the flange portion 12 of the face plate 10.

Referring to FIG. 8, I have determined that the seal defect condition that has been heretofore found in the heating edge of the flange portion occurs because of a tendency of a small lip or fin portion of the glass referred to as F in FIG. 8 to be momentarily entrapped between the tapered surface 24 of the conventional prior art plunger 21' and the peripheral surface 25 of the ring 18' of the mold. Upon further movement of the plunger 21' downwardly, the portion F of the glass is pushed downwardly to form small gaseous inclusions or blisters O which serve as points of incipient seal defect during the subsequent heating and thermal fusion of the face plate to the funnel. The defect is at (FIG. 9) or near (FIG. 10) the sealing edge.

This defect is formed readily because in making heavy flanged articles, the gob shape normally used to charge the mold for any pressed item, whether the item is round or rectangular, is roughly cylindrical in shape. The fill sequence is always such that the glass in the ends of the cylindrical gob, since it is closer to the skirt or flange of the mold, fills the skirt adjacent to the gob ends substantially prior to the time complete fill of the mold cavity is accomplished. It is this fill sequence which permits the extrusion of the glass fin between the plunger and shell during the downward motion of the plunger.

Figure 4:
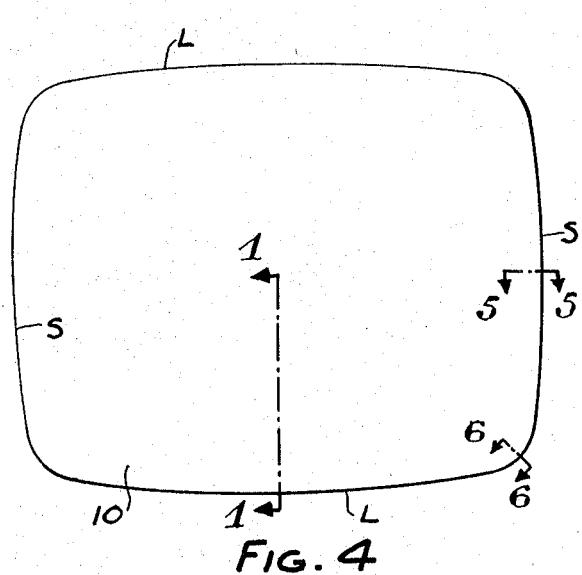
FIG. 4 is a plan view of a face plate embodying the invention.

I have determined further that the invention is especially important and useful in a face plate such as a rectangular face plate such as used to form television tube envelopes shown in FIG. 4 having long sides L and short sides S. When a cylindrical charge of glass is introduced to a mold having a corresponding configuration with the axis of the charge generally parallel to the short axis between the long sides L, and the plunger is moved downwardly into the mold, the glass tends to reach the long sides L, which are spaced radially a shorter distance from the center of the mold, sooner than the short sides S. As a result, the glass tends to be forced upwardly along the surfaces 17, 19 of the mold along the long sides sooner than along the short sides. Glass thus reaches the sealing edge forming surface 20 sooner and there is a greater tendency to form the entrapped lip or fin F.

Referring again to FIG. 8, in accordance with my invention, the plunger is extended, as shown in dotted lines, to form an extended straight surface S which is generally parallel to the axis of the plunger, except for the usual draft. Thus, as the plunger is moved downwardly, the surface S prevents any glass from moving between the surface S and the surface 25 obviating the formation of any fin or lip F. There is thus no lap over and the defect condition is prevented so that when the sealing edge is heated to thermally fuse the face plate to the funnel, a good hermetic joint is achieved.

Figure 2:
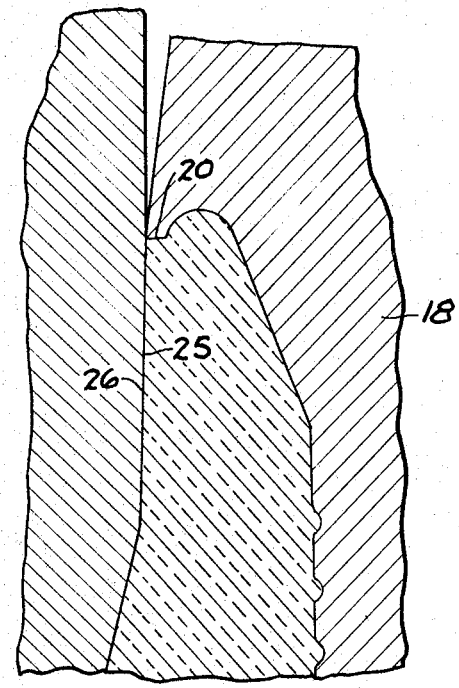
Figure 3:
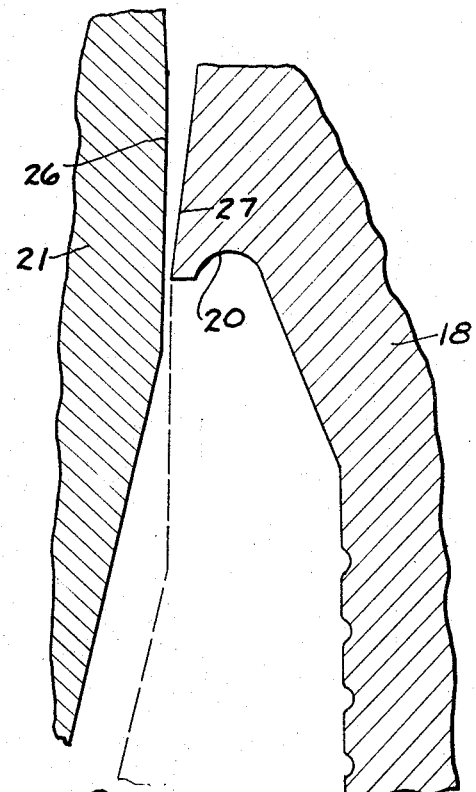
FIG. 3 is a view similar to FIG. 2 showing the relative positions of the plunger and mold apparatus during the initial pressing.

Referring to FIG. 2 which is an enlarged view of the flange portion and associated pressing plunger and mold taken generally along the line 1—1 in FIG. 4, surface 25 along the long side L is formed by a surface 26 on plunger 21 which is generally parallel to the axis of the plunger and extends a substantial distance from the sealing edge 20 of the shell 18 toward the juncture 27 of the shell 18 with the base mold 15 (FIG. 1). In accordance with this arrangement, as the plunger 21 is moved downwardly into the mold and before the plunger reaches its lowermost position, the surface 26 of the plunger 21 closes the area between the periphery 27 of the edge forming surface 20 of the shell 18 sooner, preventing any glass which might have reached the long side of the mold from passing upwardly between the surface 26 and surface 27. As a result, the lip of fin F is prevented from being formed and thereafter lapping inwardly on further movement of the plunger 21 downwardly into the mold 15.

Figures 5, 6:
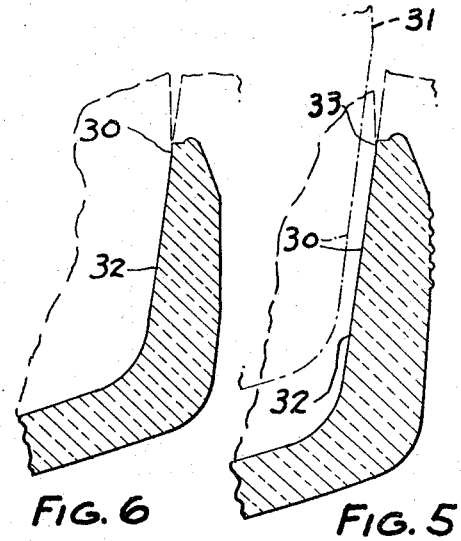
FIG. 5 is a fragmentray sectional view taken along the line 5—5 in FIG. 4.
FIG. 6 is a fragmentary sectional view taken along the line 6—6 in FIG. 4.

As shown in FIG. 7, the flat portion 26 of the mold merges with a tapered portion 30 adjacent the ends of the long side L. As shown in FIGS. 5 and 6, the remaining and corresponding portions 30 of the mold other than along the long sides L are tapered to form corresponding surfaces 32 and no extended straight axial surface need be provided since the glass has to pass a greater distance to these surfaces and there is no possibility of forming a fin F and entrapping gases to create a seal defect condition. In order that the plunger will close the mold completely when it is in its lowermost position in the mold, a straight axial surface 31 is provided at the upper edge of tapered surfaces 30 which forms a very short straight surface 33 on the flange portion of the glass article.

I claim:
1. In an apparatus for pressing a charge of glass to form a glass article such as a face plate for a cathode ray tube or the like which has a base portion and a flange portion extending from the periphery of the base portion, the combination comprising
    a mold having a base surface and a peripheral flange surface corresponding to the outer surface of the glass article to be formed,
    said mold including an inwardly extending lip defining the outer edge of the flange portion of the glass article,
    and a cooperating plunger adapted to be moved axially into the mold,
    said plunger having an external surface corresponding to the internal surface of the glass article to be formed,
    the peripheral portion of the surface of the plunger having at least some portions thereof adjacent the lip of the mold and extending substantially straight and parallel to the axis of the plunger for a substantial distance axially from the lip of the mold toward the base surface of the mold when the plunger is in operative position pressing a charge of glass in the mold, said peripheral portion having other portions thereof tapering radially inwardly from and merging with said straight portions of the peripheral portion.

2. In an apparatus for pressing a charge of glass to form a glass article such as a face plate for a cathode ray tube or the like which has a base portion and a flange portion extending from the periphery of the base portion, the combination comprising
    a mold having a base surface and a peripheral flange surface corresponding to the outer surface of the glass article to be formed,
    said mold including an inwardly extending lip defining the outer edge of the flange portion of the glass article,
    and a cooperating plunger adapted to be moved axially into the mold,
    said plunger having an external surface corresponding to the internal surface of the glass article to be formed,
    the peripheral portion of the surface of the plunger having portions thereof adjacent the lip of the mold and extending substantially straight and parallel to the axis of the plunger for a substantial distance axially from the lip of the mold toward the base surface of the mold when the plunger is in operative position pressing a charge of glass in the mold,
    said straight portions of the surface of the mold extending axially greater distances in some portions of the plunger, said peripheral portion having other portions thereof tapering radially inwardly from and merging with said straight portions of the peripheral portion.

3. In an apparatus for pressing a charge of glass to form a glass article such as a face plate for a cathode ray tube or the like which has a base portion and a flange portion extending from the periphery of the base portion, the combination comprising
    a mold having a generally rectangular base surface and a peripheral flange surface corresponding to the external surface of the glass article to be formed,
    said mold including an inwardly extending lip defining the upper edge of the flange portion of the glass article,
    and a cooperating generally rectangular plunger adapted to be moved axially into the mold,
    said plunger having an external surface corresponding to the internal surface of the glass article to be formed,
    the peripheral portion of the surface of the plunger having opposed long and opposed short sides,
    at least said opposed long sides having some portions thereof adjacent the lip of the mold and extending substantially straight and parallel to the axis of the plunger for a substantial distance axially from the lip of the mold toward the base surface of the mold when the plunger is in operative position pressing a charge of glass in the mold, said peripheral portion having other portions thereof tapering radially inwardly from and merging with said straight portions of the peripheral portion.

4. In an apparatus for pressing a charge of glass to form a glass article such as a face plate for a cathode ray tube or the like which has a base portion and a flange portion extending from the periphery of the base portion, the combination comprising
    a mold comprising a base and a shell ring defining a base surface and a peripheral flange surface corresponding to the external surface of the glass article to be formed, said shell ring including an inwardly extending lip defining the upper edge of the flange portion of the glass article, and a cooperating plunger adapted to be moved axially into the mold, said plunger having an external surface corresponding to the internal surface of the glass article to be formed, the peripheral portion of the surface of the plunger having at least some portions thereof adjacent the lip of the mold and extending substantially straight and parallel to the axis of the plunger for a substantial distance axially from the lip of the mold toward the base surface of the mold when the plunger is in operative position pressing a charge of glass in the mold, said peripheral portion having other portions thereof tapering radially inwardly from and merging with said straight portions of the peripheral portion.

5. In an apparatus for pressing a charge of glass to form a glass article face plate for a cathode ray tube or the like which has a base portion and a flange portion extending from the periphery of the base portion, the combination comprising a generally rectangular mold comprising a base and a shell ring defining a base surface and a peripheral flange surface corresponding to the external surface of the glass article to be formed, said shell ring including an inwardly extending lip defining the upper edge of the flange portion of the glass article, and a cooperating generally rectangular plunger adapted to be moved axially into the mold, said plunger having an external surface corresponding to the internal surface of the glass article to be formed, the peripheral portion of the surface of the plunger having opposed long and opposed short sides, said sides having portions thereof adjacent the lip of the mold and extending substantially and parallel to the axis of the plunger axially from the lip of the mold toward the base surface of the mold when the plunger is in operative position pressing a charge of glass in the mold.

said sides having other portions tapering radially inwardly from and merging with said straight portions, the straight portions of said long sides extending axially a substantially greater distance than the straight portions of said short sides.

References Cited by the Examiner

UNITED STATES PATENTS

| | | | |
|---|---|---|---|
| 1,578,448 | 3/1926 | Lebby | 65—68 |
| 1,787,371 | 12/1930 | Heaton | 161—1 |
| 1,899,760 | 2/1933 | Kreidl | 161—1 |
| 2,133,767 | 10/1938 | Goodrich | 65—68 |
| 2,792,318 | 5/1957 | Welch | 161—36 |
| 2,817,615 | 12/1957 | Abramson | 161—36 |
| 2,931,141 | 5/1960 | Mayhew | 65—305 X |
| 3,078,696 | 2/1963 | Torok | 65—362 X |
| 3,129,089 | 4/1964 | Torok | 65—319 |

DONALL H. SYLVESTER, *Primary Examiner.*

A. D. KELLOGG, *Assistant Examiner.*